US009520079B2

United States Patent
Fernandes et al.

(10) Patent No.: US 9,520,079 B2
(45) Date of Patent: Dec. 13, 2016

(54) STORAGE AND CARRIAGE OF GREEN METADATA FOR DISPLAY ADAPTATION

(71) Applicant: Samsung Electronics Co., Ltd., Suwon-si, Gyeonggi-do (KR)

(72) Inventors: Felix C. Fernandes, Plano, TX (US); Imed Bouazizi, Plano, TX (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 14/589,127

(22) Filed: Jan. 5, 2015

(65) Prior Publication Data

US 2015/0279265 A1 Oct. 1, 2015

Related U.S. Application Data (60) Provisional application No. 61/970,738, filed on Mar. 26, 2014, provisional application No. 61/994,050, filed on May 15, 2014, provisional application No. 62/016,348, filed on Jun. 24, 2014.

(51) Int. Cl.
| | |
|---|---|
| G09G 3/20 | (2006.01) |
| G06T 1/20 | (2006.01) |
| G09G 3/36 | (2006.01) |
| G09G 3/34 | (2006.01) |

(52) U.S. Cl.
CPC .......... G09G 3/2096 (2013.01); G09G 3/3406 (2013.01); *G09G 2320/0693* (2013.01); *G09G 2330/021* (2013.01); *G09G 2340/02* (2013.01); *G09G 2370/04* (2013.01)

(58) Field of Classification Search
None
See application file for complete search history.

(56) References Cited

U.S. PATENT DOCUMENTS

| | | | | |
|---|---|---|---|---|
| 7,409,569 | B2* | 8/2008 | Illowsky | G06F 1/3203 707/E17.005 |
| 2005/0182791 | A1* | 8/2005 | Lim | G06F 17/30038 |
| 2008/0174607 | A1 | 7/2008 | Iranli | |
| 2010/0318600 | A1* | 12/2010 | Furbeck | G06F 17/30997 709/203 |

(Continued)

OTHER PUBLICATIONS

Sudeep Pasricha, Shivajit Mohapatra, Manev Luthra, Nikil Dutt & Nalini Venkatasubramanian, Reducing Backlight Power Consumption for Streaming Video Applications on Mobile Handheld Devices,School of Information & Computer Science, 2003, pp. 1-7.*

(Continued)

*Primary Examiner* — Kimberly A Williams (57) ABSTRACT

A method for providing display adaptation metadata (DAM) to a user equipment (UE) at a system level is provided. The method includes configuring DAM for storage in an ISO Base Media File Format (ISOBMFF). The method also includes transmitting the DAM to a UE to control an energy consumption of a presentation on a display of the UE. A method for providing display adaptation metadata (DAM) to a user equipment (UE) at a system level is provided. The method includes configuring DAM for carriage in an MPEG-2 transport system (M2TS). The method also includes transmitting the DAM to a UE to control an energy consumption of a presentation on a display of the UE.

16 Claims, 5 Drawing Sheets

(56) References Cited

U.S. PATENT DOCUMENTS

| | | | |
|---|---|---|---|
| 2011/0116540 A1* | 5/2011 | O'Connor | H04N 5/44543 375/240.02 |
| 2012/0011556 A1* | 1/2012 | Kang | H04N 7/165 725/113 |
| 2012/0128058 A1 | 5/2012 | Bakharov et al. | |
| 2012/0306921 A1 | 12/2012 | Bushell et al. | |
| 2013/0278614 A1 | 10/2013 | Sultenfuss et al. | |
| 2013/0278834 A1 | 10/2013 | Ma et al. | |
| 2014/0101292 A1* | 4/2014 | Eriksson | H04L 65/602 709/219 |
| 2014/0351318 A1* | 11/2014 | Friedrich | H04L 29/08117 709/203 |
| 2015/0074129 A1* | 3/2015 | Friedrich | G06F 17/30289 707/756 |

OTHER PUBLICATIONS

International Organisation for Standardisation ISO/IEC JTC1/SC29/WG11, Coding of Moving Pictures and Audio, Jan. 2013, Geneva, Switzerland, pp. 1-7.*

International Search Report dated Jun. 10, 2015 in connection with Application No. PCT/KR2015/003003, 3 pages.

Written Opinion of the International Searching Authority dated Jun. 10, 2015 in connection with Application No. PCT/KR2015/003003, 5 pages.

* cited by examiner

STORAGE AND CARRIAGE OF GREEN METADATA FOR DISPLAY ADAPTATION

CROSS-REFERENCE TO RELATED APPLICATION(S) AND CLAIM OF PRIORITY

The present application claims priority to U.S. Provisional Patent Application Ser. No. 61/970,738, filed Mar. 26, 2014, entitled "STORAGE AND CARRIAGE OF GREEN METADATA FOR DISPLAY ADAPTATION." The present application claims priority to U.S. Provisional Patent Application Ser. No. 61/994,050, filed May 15, 2014, entitled "STORAGE AND CARRIAGE OF GREEN METADATA FOR DISPLAY ADAPTATION." The present application claims priority to U.S. Provisional Patent Application Ser. No. 62/016,348, filed Jun. 24, 2014, entitled "STORAGE AND CARRIAGE OF GREEN METADATA FOR DISPLAY ADAPTATION." The content of the above-identified patent documents is incorporated herein by reference.

TECHNICAL FIELD

This disclosure relates generally to the reduction of energy consumption in wireless mobile communication devices and, more specifically, to the storage and carriage of metadata for display adaptation (DA).

BACKGROUND

Display resolution on mobile devices has advanced significantly. Rendering a large display depletes battery levels quickly, especially for video where high-frequency frame buffer replenishment is required. Metadata-based display adaptation reduces LCD and OLED power consumption. For LCD displays, the power consumption is a monotonic function of the backlight level. For OLED displays, the power consumption is a monotonic function of the supply voltage. Green metadata derived from image statistics is used to control backlight (or supply voltage) to provide maximum power reduction. The green metadata also enables a trade-off between power reduction and perceived video quality.

SUMMARY

In a first embodiment, a method for providing display adaptation metadata (DAM) to a user equipment (UE) at a system level is provided. The method includes configuring DAM for storage in an ISO Base Media File Format (ISOBMFF). The method also includes transmitting the DAM to a UE to control an energy consumption of a presentation on a display of the UE.

In a second embodiment, a display adaptation metadata (DAM) sending system is provided. The system includes a processor and a transmitter. The processor is configured to configure DAM for storage in an ISO Base Media File Format (ISOBMFF). The transmitter is configured to transmit the DAM to a user equipment (UE) to control an energy consumption of a presentation on a display of the UE.

In a third embodiment, a method for providing display adaptation metadata (DAM) to a user equipment (UE) at a system level is provided. The method includes configuring DAM for carriage in an MPEG-2 transport system (M2TS). The method also includes transmitting the DAM to a UE to control an energy consumption of a presentation on a display of the UE.

In a fourth embodiment, a display adaptation metadata (DAM) sending system is provided. The system includes a processor and a transmitter. The processor is configured to configure DAM for carriage in an MPEG-2 transport system (M2TS). The transmitter is configured to transmit the DAM to a UE to control an energy consumption of a presentation on a display of the UE.

In a fifth embodiment, a user equipment (UE) is provided. The UE includes a receiver configured to receive Display Adaption Metadata (DAM), wherein the DAM is configured in an International Standards Organization Base Media File Format (ISOMBFF). The UE also includes a processor configured to determine a constant-backlight-voltage-time-interval value from the DAM. If the number of constant-backlight-voltage-time-interval values is greater than 1, the DAM is made available to the display with a lead time (relative to the video composition time) greater than or equal to a largest constant-backlight-voltage-time-interval value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
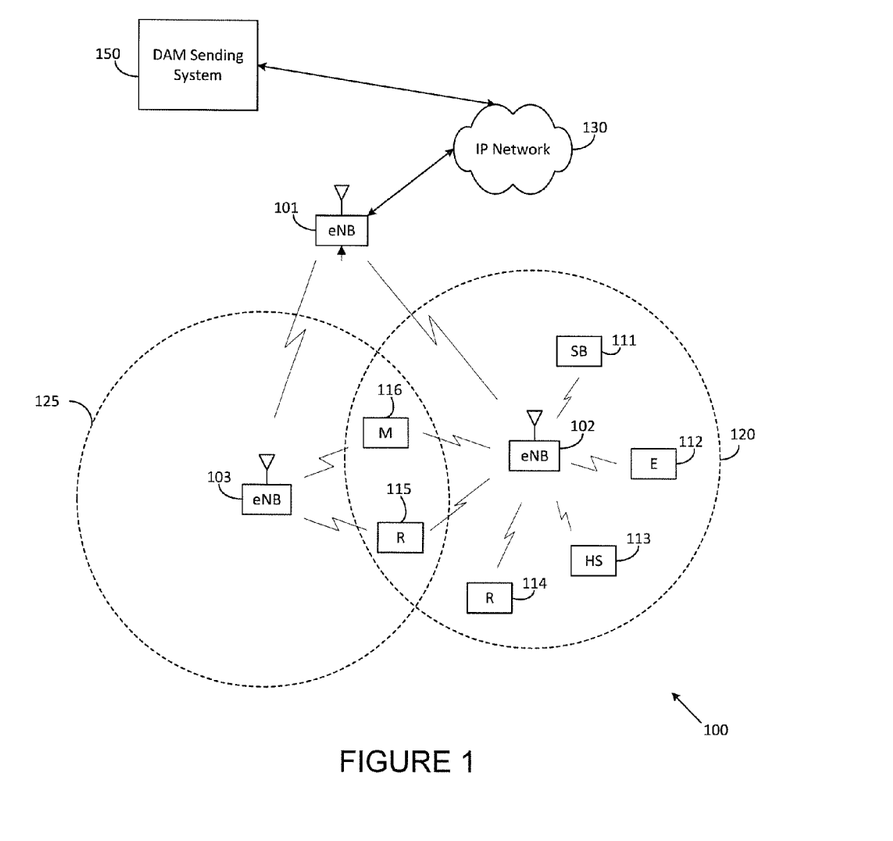
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, an eNB 103, and a Display Adaptation Metadata sending system 150. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail herein, the DAM sending system 150 is configured to transport DAM to a UE at the system level. For example, as discussed further herein, the DAM sending system 150 configures DAM for transport in ISO Base Media File Format (ISOBMFF) and the MPEG-2 Transport System (M2TS). The system 150 is also configured to transmit DAM to one or more UEs in ISOBMFF or using an M2TS. DAM includes at least one of receiver-dependent metadata sets, contrast-enhancement metadata, non-aggregated metadata, and the like.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
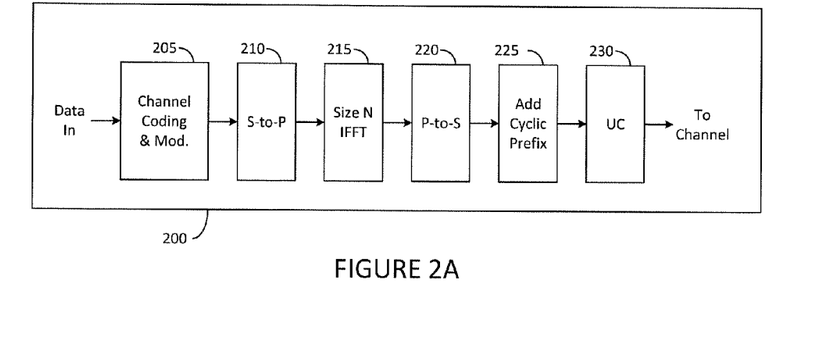
FIGS. 2A and 2B illustrate example wireless transmit and receive paths according to this disclosure.
Figure 2B:
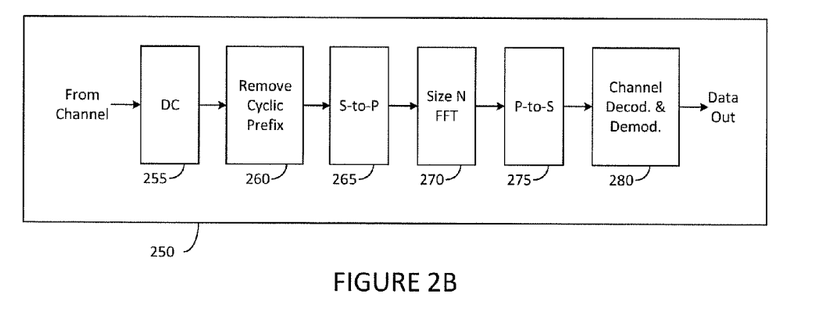

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to carry green metadata for DA.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal.

The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architecture could be used to support wireless communications in a wireless network.

Figure 3:
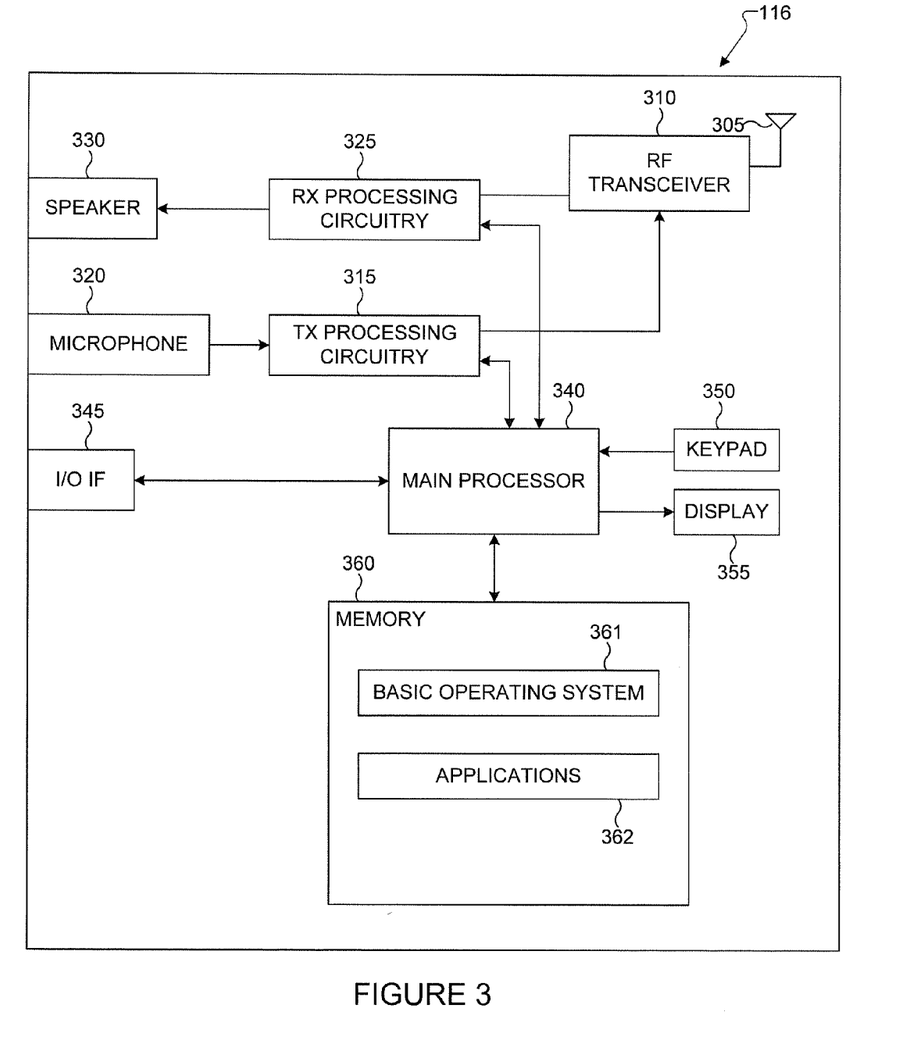
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for receiving DAM at the system level and displaying a presentation with improved power reduction. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Recently, display resolution on mobile devices has advanced significantly. Rendering a large display depletes battery levels quickly, especially for video where high-frequency frame buffer replenishment is required. Metadata-based display adaptation reduces LCD and OLED power consumption. For LCD displays, the power consumption is a monotonic function of the backlight level. For OLED displays, the power consumption is a monotonic function of the supply voltage. Green metadata derived from image statistics is used to control backlight (or supply voltage) to provide maximum power reduction. The green metadata also enables a trade-off between power reduction and perceived video quality.

For systems without a signaling mechanism from the receiver to the transmitter the MPEG Green Metadata Standard (ISO/IEC 23001-11 Committee Draft w14131) defines the message format for display-adaptation green metadata as illustrated below in Table 1.

carriage mechanisms store and carry an entire message format for easy transport, sharing, and editing along with media data. In the ISOBMFF, an entire message is stored along with aggregated metadata to enable energy efficient video-segment selection. Also in the ISOBMFF, a message can be partitioned into static and dynamic information. The static information is stored in sample entries while the dynamic information is stored in samples. In M2TS, a message can also be partitioned into static and dynamic information. In this case, static information is stored in extension descriptors while dynamic information is stored in access units.

Figure 4:
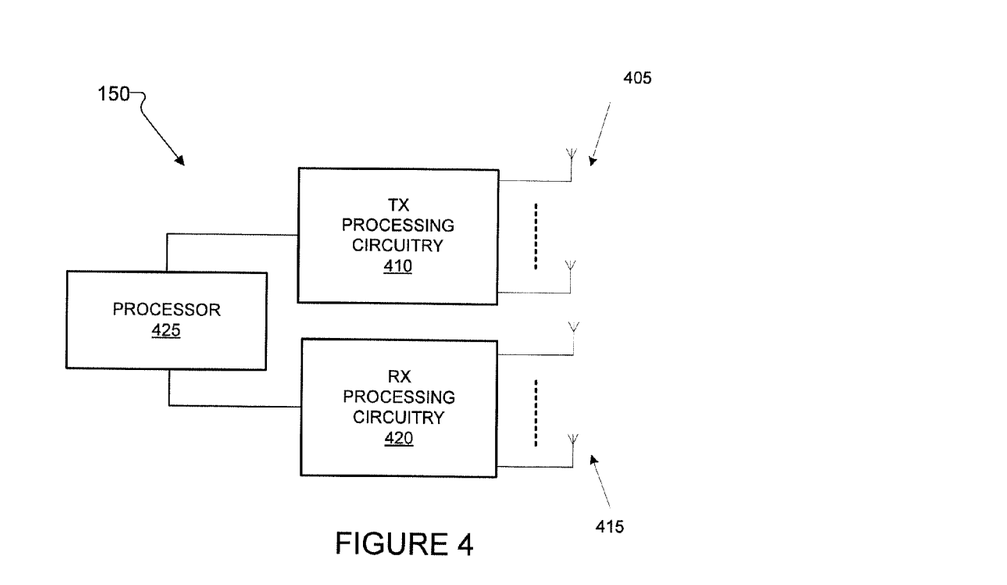
FIG. 4 illustrates a block diagram of a system configured to deliver a presentation to a user equipment according to this disclosure.

FIG. 4 illustrates a block diagram of a Display Adaption Metadata (DAM) sending system 150 (hereinafter "system 150") configured to transport DAM to a UE according to this disclosure. The embodiment of the system 150 shown in FIG. 4 is for illustration only. Other embodiments could be used without departing from the scope of the present disclosure.

The system 150 transports DAM to a UE at the system level. The system 150 configures DAM for transport in ISO Base Media File Format (ISOBMFF) and the MPEG-2 Transport System (M2TS). The system 150 is also configured to transmit DAM to one or more UEs in ISOBMFF or using an M2TS. DAM includes at least one of receiver-dependent metadata sets, contrast-enhancement metadata, and non-aggregated metadata. DAM can also include aggregated metadata and the like.

TABLE 1

| | Size (bits) | Descriptor |
|---|---|---|
| num_constant_backlight_voltage_time_intervals | 2 | unsigned integer |
| num_max_variations | 2 | unsigned integer |
| num_quality_levels | 4 | unsigned integer |
| for (j = 0; j < num_max_variations; j++) { | | |
|     max_variation[j] | 8 | unsigned integer |
| } | | |
| for (k = 0; k < num_constant_backlight_voltage_time_intervals;k++) { | | |
|     constant_backlight_voltage_time_interval[k] | 16 | unsigned integer |
|     for (j = 0; j < num_max_variations; j++) { | | |
|         lower_bound[k][j] | 8 | unsigned integer |
|         if (lower_bound[k][j] > 0) { | | |
|             upper_bound[k][j] | 8 | unsigned integer |
|         } | | |
|         rgb_component_for_infinite_psnr[k][j] | 8 | unsigned integer |
|         for (i = 1; i <= num_quality_levels; i++) { | | |
|             max_rgb_component[k][j][i] | 8 | unsigned integer |
|             scaled_psnr_rgb[k][j][i] | 8 | unsigned integer |
|         } | | |
|     } | | |
| } | | |

In addition, Section 4 of w14131 describes carriage of rudimentary green metadata in ISOBMFF. This rudimentary green metadata is supplemented by the MPEG DASH standard and is used only for energy-efficient selection of video segments.

As disclosed herein methods and apparatus are used to transport green metadata messages at the systems level using storage or carriage mechanisms. For example, SEI message transports green metadata at the video level. Because display and video subsystems are separately designed and optimized in commercial devices, it can be inconvenient for the metadata to be transferred from the video to the display subsystem.

The ISO Base Media File Format (ISOBMFF) and the MPEG-2 Transport Stream (M2TS) are systems-level storage and carriage mechanisms for carrying and storing green metadata for DA at the systems level. These storage and The DAM sending system 150 can be in a wireless or a wired communication system that implements various embodiments of the present disclosure. The system 150 is configured transmit DAM for reduced energy consumption during content presentation on a UE, such as UE 116, in a wireless communications system, such as, for example, wireless system 100 in FIG. 1. The system 150 includes transmit (TX) antennas 405, transmit (TX) processing circuitry 410, receive (RX) antennas 415, receive (RX) processing circuitry 220, and a processor 425.

TX processing circuitry 410, such as a transmitter, transmits DAM to a UE. For example, the TX processing circuitry 410 transmits DAM for picture and video presentation files to a display device of a UE. TX processing circuitry 410 also can perform spatial multiplexing via layer mapping to different antennas in TX antennas 405 and different ports of antennas in TX antennas 405. In certain embodiments, the system 150 transmits MPUs to a display device via a wired connection. RX processing circuitry 220, such as a receiver, receives a signal via receive (RX) antennas 415, from a UE requesting a picture or video presentation. For example, the RX processing circuitry 420 receives a request for a picture or video presentation with DAM metadata for reduced power consumption from a UE with a display.

Processor 425 includes processing circuitry that controls the overall operation of the system 150. In one such operation, processor 425 controls the configuration of DAM for storage in ISOBMFF or carriage in M2TS. The processor 425 also controls the transmitter to transmit DAM in ISOBMFF or in M2TS to a UE so that the UE has reduced energy consumption when displaying a picture or video presentation on a display of the UE.

As disclosed herein, the system 150 configures DAM for transport to a UE. The system 150 configures and stores aggregated DAM and non-aggregated DAM in ISOBMFF, configures DAM for carriage in M2TS, configures and stores non-aggregated DAM in ISOBMFF, and configures DAM for carriage in M2TS with association to media data for PES packets or MPEG sections.

In an embodiment, ISOBMFF stores both aggregated and non-aggregated DA metadata. The following definition is provided below.

SampleEntryType: 'dfce'
Container: Sample Description Box ('stsd')
Mandatory: No
Quantity: 0 or 1

Display power reduction metadata provides frame statistics and quality indicators for the media track that the metadata track refers to by means of cdsc' reference. This metadata allows the client to attain a specified quality level by scaling frame-buffer pixels and reduce power by decreasing the display backlight or OLED voltage. Static metadata is stored in the sample entry. Dynamic metadata is stored in samples and is either non-aggregated or aggregated. The non-aggregated metadata is associated with one or more video frames. In contrast, the aggregated metadata is associated with DASH segments of video.

The Decoding Time to Sample box provides the decoding time for the sample so that the metadata contained therein is made available to the display with sufficient lead time relative to the video composition time. The video composition time and metadata composition time are identical. The lead time is used because display settings are adjusted in advance of presentation time for correct operation. If num_constant_backlight_voltage_time_intervals>1, then the lead time should be larger than the largest constant_backlight_voltage_time_interval. An example syntax of an embodiment of display power reduction metadata sample entry storing static metadata is provided as follows:

```
class DisplayFineControlMetaDataSampleEntry( )
    extends MetaDataSampleEntry ('dfce') {
  DisplayFineControlConfigurationBox( );
}
aligned(8) class DisplayFineControlConfigurationBox
    extends FullBox('dfcC', version = 0, flags = 0) {
  unsigned int(2) num_constant_backlight_voltage_time_intervals;
  unsigned int(6) reserved = 0;
  unsigned int(16)constant_backlight_voltage_time_interval[
    num_constant_backlight_voltage_time_intervals ];
  unsigned int(2) num_max_variations;
  unsigned int(6) reserved = 0;
  unsigned int(16) max_variation[ num_max_variations ];
}
```

The dynamic metadata is stored in samples and can be associated either with one or more video frames (non-aggregated metadata) or with DASH segments of video (aggregated metadata). Semantics are defined in ISO/IEC 23001-11. A sample format is as follows:

```
class QualityLevels (num_quality_levels) {
  for (i = 0; i < num_quality_levels; i++) {
    unsigned int(8) max_rgb_component;
    unsigned int(8) scaled_psnr_rgb;
  }
}
class NonAggregatedMetadataSet (num_quality_levels) {
  unsigned int(8) lower_bound;
  if (lower_bound > 0)
    unsigned int(8) upper_bound;
  QualityLevels(num_quality_levels);
}
class DisplayPowerReductionMetaDataSample {
  unsigned int(1) isAggregatedMetadataFlag;
  unsigned int(7) reserved = 0;
  unsigned int(4) num_quality_levels;
  unsigned int(4) reserved = 0;
  if (isAggregatedMetadataFlag == 0) {
    for (k = 0; k < num_constant_backlight_voltage_time_intervals; k++)
      for (j = 0; j < num_max_variations; j++)
        NonAggregatedMetadataSet(num_quality_levels);
  else // aggregated metadata
    QualityLevels(num_quality_levels);
}
```

In an embodiment, M2TS is used to store non-aggregated metadata. M2TS specifies a format for the carriage of green metadata that enables display power reduction. Generally, metadata consists of frame statistics and quality indicators. As discussed herein, metadata allows the client to attain a specified quality level by scaling frame-buffer pixels and reduce power by decreasing the display backlight or OLED voltage.

When M2TS is used to store non-aggregated metadata, static metadata is stored in an extension descriptor. Furthermore, dynamic metadata is stored in access units and is associated with one or more video frames. Packetized elementary streams (PES) packets carrying green metadata are identified by Stream type "0xXX." In the context of this annex, the "Green Metadata Display Power Reduction" stream is called a GREEN stream. The GREEN stream provides metadata for the video stream that it is associated with through the Program Map Table. An example format for the GREEN extension descriptor containing static metadata is provided below in Table 2. Semantics are defined in ISO/IEC 23001-11.

TABLE 2

| Syntax | No. bits | Mnemonic |
| --- | --- | --- |
| GREEN_extension_descriptor( ) { | | |
| descriptor_tag | 8 | uimsbf |
| descriptor_length | 8 | uimsbf |
| num_constant_backlight_voltage_time_intervals | 2 | uimsbf |
| reserved | 6 | bslbf |
| for (i=0; I < num_constant_backlight_voltage_time_intervals; i++) | | |
| constant_backlight_voltage_time_interval[i] | 16 | uimsbf |
| num_max_variations | 2 | uimsbf |
| Reserved | 6 | bslbf |
| for (i=0; I < num_max_variations; i++) | | |
| max_variation[i] | 16 | uimsbf |
| } | | |

The decoding time to sample (DTS) for a GREEN Access Unit is such that the metadata contained therein is made available to the display with sufficient lead time relative to the presentation time to sample (PTS) of the associated media access unit (MAU). The PTS of the MAU and the PTS of the green access unit (GAU) are identical. The lead time is required because display settings must be adjusted in advance of the presentation time for correct operation. If num_constant_backlight_voltage_time_intervals>1, then the lead time is larger than the largest constant_backlight_voltage_time_interval.

An example format of a GAU is defined in Table 3 shown below. GAUs contain dynamic metadata and are carried as PES packets.

TABLE 3

| Syntax | No bits | Mnemonic |
|---|---|---|
| GREEN_AU { | | |
| num_quality_levels | 4 | uimsbf |
| reserved | 4 | bslbf |
| for (k=0; k < num_constant_backlight_voltage_time_intervals; k++) | | |
| for (j=0; j < num_max_variations; j++) | | |
| metadataSet(num_quality_levels) | | |
| } | | |

As similarly described in ISO/IEC 23001-11, each combination of constant_backlight_voltage_time_interval and max_variation is associated with metadata such as metadata defined in Table 4.

TABLE 4

| Syntax | No bits | Mnemonic |
|---|---|---|
| metadataSet(num_quality_levels) { | | |
| lower_bound | 8 | uimsbf |
| if (lower_bound > 0) | | |
| upper_bound | 8 | uimsbf |
| qualityLevels(num_quality_levels) | | |
| } | | |

Table 5 illustrated below defines the example quality levels of Table 4. Semantics are defined in ISO/IEC 23001-11.

TABLE 5

| Syntax | No bits | Mnemonic |
|---|---|---|
| qualityLevels(num_quality_levels) { | | |
| for (i=0; i < num_quality_levels; i++) { | | |
| max_rgb_component | 8 | uimsbf |
| scaled_psnr_rgb | 8 | uimsbf |
| } | | |
| } | | |

In an embodiment, ISOBMFF stores non-aggregated DA metadata. The following definition is provided below.
Box Type: 'dfce'
Container: Sample Description Box ('stsd')
Mandatory: No
Quantity: 0 or 1

Display power reduction metadata provides frame statistics and quality indicators for the media track that the metadata track refers to by means of 'cdsc' reference. This metadata allows the client to attain a specified quality level by scaling frame-buffer pixels and reduce power by decreasing the display backlight or OLED voltage. Static metadata is stored in the sample entry. Dynamic metadata is stored in samples and is associated with one or more video frames.

The DTS box provides the decoding time for the sample so that the metadata contained therein is made available to the display with sufficient lead time relative to the video composition time. The video composition time and metadata composition time are identical. The lead time is used because display settings are adjusted in advance of presentation time for correct operation. If num_constant_backlight_voltage_time_intervals>1, then the lead time is larger than the largest constant_backlight_voltage_time_interval.

An example syntax of an embodiment of display power reduction metadata sample entry storing static metadata is provided as follows:

```
class DisplayFineControlMetaDataSampleEntry( )
    extends MetaDataSampleEntry ('dfce') {
  DisplayFineControlConfigurationBox( );
}
aligned(8) class DisplayFineControlConfigurationBox
    extends FullBox('dfcC', version = 0, flags = 0) {
  unsigned int(2) num_constant_backlight_voltage_time_intervals;
  unsigned int(6) reserved = 0;
  unsigned int(16)constant_backlight_voltage_time_interval[
                num_constant_backlight_voltage_time_intervals ];
  unsigned int(2) num_max_variations;
  unsigned int(6) reserved = 0;
  unsigned int(16) max_variation[ num_max_variations ];
}
```

The dynamic metadata is stored in samples and is associated with one or more video frames. Semantics are defined in ISO/IEC 23001-11. A sample format is as follows.

```
class QualityLevels (num_quality_levels) {
  unsigned int(8) rgb_component_for_infinite_psnr;
  for (i = 1; i <= num_quality_levels; i++) {
    unsigned int(8) max_rgb_component;
    unsigned int(8) scaled_psnr_rgb;
  }
}
class MetadataSet (num_quality_levels) {
  unsigned int(8) lower_bound;
  if (lower_bound > 0)
    unsigned int(8) upper_bound;
  QualityLevels(num_quality_levels);
}
class DisplayPowerReductionMetaDataSample {
  unsigned int(4) num_quality_levels;
  unsigned int(4) reserved = 0;
  for (k=0; k<num_constant_backlight_voltage_time_intervals; k++)
    for (j = 0; j < num_max_variations; j++)
      MetadataSet(num_quality_levels);
}
```

In an embodiment, when DA metadata is carried either in PES packets or in MPEG sections, DA metadata is explicitly associated with media data. DA metadata that is explicitly associated with media data specifies a format for carriage of green metadata that enables power reduction. This metadata allows a client device to attain a specified quality level by scaling frame-buffer pixels and to reduce power by decreasing the display backlight or OLED voltage. Static metadata is sent once per event or program and can be signaled using a new descriptor. Dynamic metadata is stored in access units and is associated with one or more video frames In an embodiment, M2TS is used to store non-aggregated metadata. M2TS specifies a format for the carriage of green metadata that enables display power reduction. Generally, metadata consists of frame statistics and quality indicators. As discussed herein, metadata allows the client to attain a specified quality level by scaling frame-buffer pixels and reduce power by decreasing the display backlight or OLED voltage.

Static metadata is sent once per event or program and is signaled using a new descriptor. Dynamic metadata is stored in access units and is associated with one or more video frames. The access units are encapsulated in PES packets or MPEG sections identified by a new stream_type (0xoo). The "Green Metadata Display Power Reduction" stream is called a GREEN stream. The GREEN stream provides metadata for the video stream that the GREEN stream is associated with through the Program Map Table.

An example format for the GREEN extension descriptor containing static metadata is provided below in Table 6. Semantics are defined in ISO/IEC 23001-11.

TABLE 6

| Syntax | No. bits | Mnemonic |
|---|---|---|
| GREEN_extension_descriptor( ) { | | |
|   descriptor_tag | 8 | uimsbf |
|   descriptor_length | 8 | uimsbf |
|   num_constant_backlight_voltage_time_intervals | 2 | uimsbf |
|   Reserved | 6 | bslbf |
|   for (i=0; i < | | |
| num_constant_backlight_voltage_time_intervals; i++) { | 16 | uimsbf |
|     constant_backlight_voltage_time_interval[i] | | |
|     num_max_variations | 2 | uimsbf |
|     Reserved | 6 | bslbf |
|     for (i=0; i < num_max_variations; i++) | | |
|       max_variation[i] | 16 | uimsbf |
| } | | |

An example format of a GREEN access unit (GAU) is defined below in Table 7. (GAU) contains dynamic metadata and are carried as PES packets (or sections).

TABLE 7

| Syntax | No. bits | Mnemonic |
|---|---|---|
| GREEN_AU { | | |
|   decoding_time_stamp | xxx | uimsbf |
|   num_quality_levels | 4 | uimsbf |
|   reserved | 4 | bslbf |
|   for (k=0; k < | | |
| num_constant_backlight_voltage_time_intervals; | | |
| k++) | | |
|     for (j=0; j < num_max_variations; j++) | | |
|       metadataSet(num_quality_levels) | | |
| } | | |

As explained in ISO/IEC 23001-11, each combination of constant_backlight_voltage_time_interval and max_variation is associated with a metadata set defined below in Table 8.

TABLE 8

| Syntax | No. bits | Mnemonic |
|---|---|---|
| metadataSet(num_quality_levels) { | | |
|   lower_bound | 8 | uimsbf |
|   if (lower_bound > 0) | | |
|     upper_bound | 8 | uimsbf |
|   qualityLevels(num_quality_levels) | | |
| } | | |

The quality levels illustrated above in Table 8 are defined below in Table 9. Semantics are defined in ISO/IEC 23001-11.

TABLE 9

| Syntax | No. bits | Mnemonic |
|---|---|---|
| qualityLevels(num_quality_levels) { | | |
|   rgb_component_for_infinite_psnr | 8 | uimsbf |
|   for (i=1; i <= num_quality_levels; i++) { | 8 | uimsbf |
|     max_rgb_component | 8 | uimsbf |
|     scaled_psnr_rgb | | |
|   } | | |
| } | | |

The GAUs are decoded before the time indicated in decoding_time_stamp. This ensures that the metadata within a GAU is made available to the display with sufficient lead time relative to the PTS of the associated media access unit. The PTS of the MAU and the PTS of the GAU are identical. The lead time is used because display settings are adjusted in advance of presentation time for correct operation. If num_constant_backlight_voltage_time_intervals>1, then the lead time is equal to or larger than the largest constant_backlight_voltage_time_interval.

In an embodiment, when DAM is carried in MPEG sections, the DA metadata associates with the media data. A format for carriage of green metadata that enables display power reduction is specified. The metadata consists of frame statistics and quality indicators. This metadata allows a client device to attain a specified quality level by scaling frame-buffer pixels and to reduce power by decreasing the display backlight or OLED voltage.

Static metadata is sent once per event or program and is signaled using a new description. Dynamic metadata is stored in access units and is associated with one or more video frames. The access units are encapsulated in MPEG sections identified by a new stream type (0xXX). In the context of this annex, the "Green Metadata Display Power Reduction" stream is called a GREEN stream. The GREEN stream provides metadata for the video stream that the GREEN stream is associated with through the Program Map Table. An example format for the GREEN extension descriptor containing static metadata is provided below in Table 10. Semantics are defined in ISO/IEC 23001-11.

TABLE 10

| Syntax | No. bits | Mnemonic |
|---|---|---|
| GREEN_extension_descriptor( ) { | | |
|   descriptor_tag | 8 | uimsbf |
|   num_constant_backlight_voltage_time_intervals | 2 | uimsbf |
|   Reserved | 6 | bslbf |
|   for (i=0; i < | | |
| num_constant_backlight_voltage_time_intervals; i++) { | 16 | uimsbf |
|     constant_backlight_voltage_time_interval[i] | | |
|     num_max_variations | 2 | uimsbf |
|     Reserved | 6 | bslbf |
|     for (i=0; i < num_max_variations; i++) | | |
|       max_variation [i] | 16 | uimsbf |
| } | | |

Green Access Units (GAUs) are carried using the MPEG-2 private section syntax with section_syntax_indicator set to '0' as shown in Table 10-1.

| Syntax | Bits | Mnemonic/Description |
|---|---|---|
| Green_access_unit_section_message( ) { | | |
|     table_ID | 8 | uimsbf |
|     section_syntax_indicator | 1 | bslbf |
|     private_indicator | 1 | bslbf |
|     reserved | 2 | bslbf |
|     private_section_length | 12 | uimsbf |
|     If (section_syntax_indicator == 0) { | | |
|       for (i=0; i<N; i++) { | | |
|         0010 | 4 | bslbf |
|         Display_in_PTS [32..30] | 3 | bslbf |
|         marker_bit | 1 | bslbf |
|         Display_in_PTS [29..15] | 15 | bslbf |
|         marker_bit | 1 | bslbf |
|         Display_in_PTS [14..0] | 15 | bslbf |
|         marker_bit | 1 | bslbf |
|       Green_Au( ) | | |
|       CRC_32 | 32 | rpchof |
|       } | | |
|     } | | |
| } | | |

The semantics for the GAU section syntax are as follows:
table_id shall be set to 0x09.
section_syntax_indicator shall be set to '0'.
Display_in_PTS is the 33-bit PTS specified similar to that defined in the PES header and is used with the associated video access unit.
Green_AU( ) is defined further herein.

An example format of a GREEN access unit (GAU) is defined below in Table 11. (GAU) contains dynamic metadata and are carried in MPEG as sections.

TABLE 11

| Syntax | No. bits | Mnemonic |
|---|---|---|
| GREEN_AU { | | |
| num_quality_levels | 4 | uimsbf |
| reserved | 4 | bslbf |
| for (k=0; k < num_constant_backlight_voltage_time_intervals; k++) { | | |
|   for (j=0; j < num_max_variations; j++) { | | |
|     lower_bound | 8 | uimsbf |
|     if (lower_bound > 0) | | |
|       upper_bound | 8 | uimsbf |
|     rgb_component_for_infinite_psnr | 8 | uimsbf |
|     for (i=1; i <= num_quality_levels; i++) { | | |
|       max_rgb_component | 8 | uimsbf |
|       scaled_psnr_rgb | 8 | uimsbf |
|     } | | |
|   } | | |
| } | | |
| } | | |

As explained in ISO/IEC 23001-11, each combination of constant_backlight_voltage_time_interval and max_variation is associated with contrast-enhancement metadata and a set of quality levels as defined in Table 11. Semantics are defined in ISO/IEC 23001-11.

The GAU should be decoded and information should be available before the associated Media Access Unit (MAU) is decoded. Such a timing relationship guarantees that the metadata within the GAU is made available to the display with sufficient lead time relative to the PTS of the associated MAU. Note that the PTS of the MAU and the PTS of the GAU are identical. The GAU is transmitted in the transport stream with a sufficient lead time so that the display control settings can be adjusted in advance of presentation time for correct operation. If num_constant_backlight_voltage_time_intervals>1, then the lead time should be equal to or larger than the largest constant_backlight_voltage_time_interval.

Each MPEG program shall not contain more than one Green metadata component (stream_type equal to 0x2B). For programs that contain Green metadata component and more than one video component, the association of Green metadata component to a specific video component or components is not defined.

Applications that use carouseling of Green access unit data over a given program can do so as long as the display_in_PTS value is restamped to conform to the PCR clock.

In some embodiments, a GAU is decoded a period of time (such as four seconds) before a MAU is presented. A similar timing relationship is enforced between the subtitle DTS and the MAU PTS. In some embodiments, the relationship is enforced between the subtitle DTS and the MAU DTS. Such a timing relationship ensures that the metadata within a GAU is available to the display with sufficient lead time relative to the PTS of the associated MAU. The PTS of the MAU and the PTS of the GAU are identical. The lead time is used because display settings are adjusted in advance of the presentation time for correct operation. If num_constant_backlight_voltage_time_intervals>1, then the four-second lead time is equal to or larger than the largest constant_backlight_voltage_time_interval.

In other embodiments, GAU containing dynamic metadata are carried as PES packets with a PTS but no DTS. The lead time for the decoding of such PES packets is stored in the extension descriptor as static metadata. These embodiments allow PES packets to carry non-video (green) data, but avoid such non-video PES packets from having DTS unequal to PTS, which is undesirable in M2TS.

Figure 6:
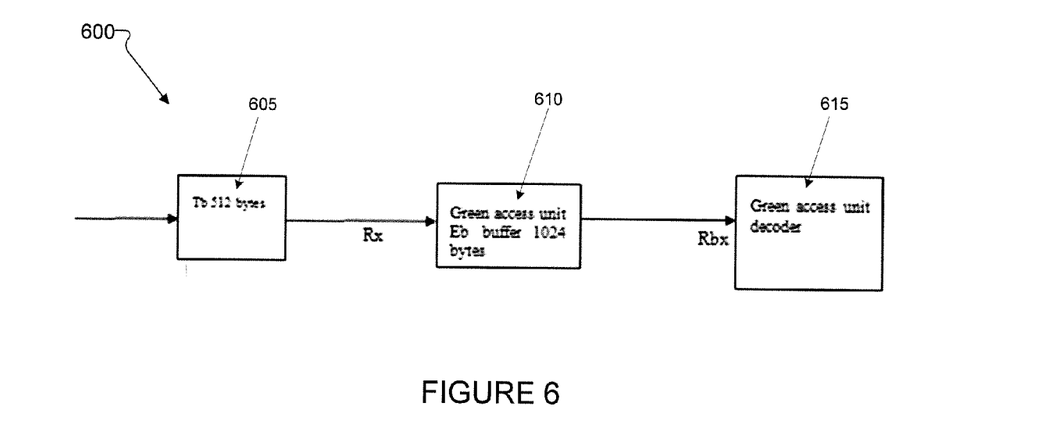
FIG. 6 is an example Green Access Decoder Processing Model according to this disclosure.

In some embodiments, a buffer model reflects processing required to handle Green access units. The model can be used to establish constraints which can be used to verify the validity of dynamic Green metadata prepared in accordance with the M2TS. FIG. 6 is an example Green Access Decoder Processing Model 600 according to this disclosure. The embodiment of the model 600 shown in FIG. 6 is for illustration only. Other embodiments could be used without departing from the scope of this disclosure.

As shown in FIG. 6, M2TS packets come into the model 600 at the left, and are filtered by PID. Packets whose PID matches the green access unit PID flow into the 512 byte transport buffer 605. These buffered packets are removed at a rate of Rx=32 kbps (kilobits/second) and stored in the Green access unit Eb buffer (1024 Bytes) 610. Green access unit table sections are removed from the Eb buffer 610 immediately after the full access unit is available (based on section length) and these are passed onto the Green access unit decoder 615 at a rate Rbx=32 kbps for decoding and association with the video at time=display_in_PTS. Eb buffer 610 shall not overflow and the Green access unit section shall be available in the Eb buffer 610 at least 170 ms before display_in_PTS.

It will be understood by a practitioner skilled in the art that the quantities 32 kbps, 1024 bytes and 170 ms are illustrative and that other values which fulfill the same purposes may be used. For example, the 170 ms deadline provides the GAU decoder with a two-frame latency (at 30 Hz video frame rate, 2-frame latency is 66.67 ms) to decode the metadata and then apply the backlight control 100 ms ahead of the PTS to prevent flicker on existing displays. Therefore, the quantity 170 is approximately 100+66.67, but this quantity can be adapted to other frame rates, GAU decoder latencies and display technologies.

Figure 5:
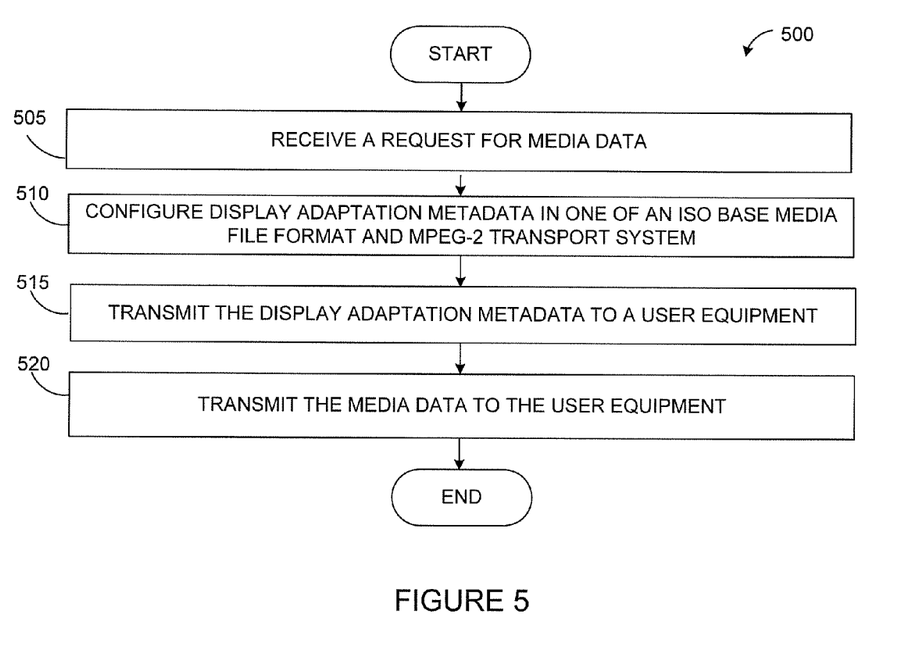
FIG. 5 is a flow diagram illustrating an example method according to this disclosure.

FIG. 5 is a flow diagram illustrating an example method for providing display adaptation metadata (DAM) to a user equipment (UE) at a system level according to this disclosure. At block 505, a system 150 receives a request for media data. For example, the system 150 can receive a request for a picture presentation or a video presentation, via a receiver 420, to be displayed on a display of a UE 116. In an embodiment, the system 150 can receive the request from the UE 116 to receive media data to be displayed on a display of the UE 116. The system 150 can also receive the request from a device other than the UE 116 (such as a server or another UE) to receive media data to be displayed on a display of the UE 116. Furthermore, the At block 510, the system 150, via a processor 425, configures DAM for at least one of storage in an ISOBMFF or for carriage in M2TS. The DAM includes at least one of receiver dependent metadata, contrast-enhancement metadata, or non-aggregated quality levels. In an embodiment, the DAM is associated with a particular packet of media data.

At block 515, the system 150, via the transmitter 410, transmits the DAM to a UE to control an energy consumption of a presentation on a display of the UE. At block 520, the system 150, via the transmitter 410, transmits the media data to the user equipment. The system 150 transmits media data to the UE so that the UE receives the media data at substantially the same time that the UE receives the DAM. The system 150, via the processor 425, configures at least one of the media data or the DAM so that UE begins processing the DAM before the UE begins processing the media data. By configuring at least one of the media data or the DAM so that UE begins processing the DAM before the UE begins processing the media data, the DAM can be made available to the display with sufficient lead time relative to the media data for proper energy savings. It should be understood that block 515 where the system 150 transmits Dam to a UE to control an energy consumption of a presentation on a display of the UE and block 520 where the system 150 transmits the media data to the user equipment can be done consecutively or in parallel at the same time or overlapping times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE), comprising:
 a receiver configured to receive Display Adaption Metadata (DAM), wherein the DAM is configured in an International Standards Organization Base Media File Format (ISOMBFF) or a Motion Pictures Expert Group 2 (MPEG-2) Transport system (M2TS);
 a processor configured to:
  determine a constant backlight voltage time interval value from the DAM, and
  in response to determining that a number of constant-backlight-voltage-time-interval values is greater than 1, send the DAM to a display with a lead time relative to a video composition time greater than or equal to a largest constant backlight voltage time interval value; and
 the display configured to, when receiving the DAM with a lead time greater than or equal to the largest constant-backlight-voltage-time-interval value, adjust its control settings with sufficient time in advance of displaying the associated media data.

2. The UE of claim 1, wherein the DAM comprises at least one receiver dependent metadata, contrast-enhancement metadata, or non-aggregated quality levels, and wherein the DAM is associated with a particular packet of media data.

3. The UE of claim 1, wherein the receiver is configured to receive media data concurrently with the DAM.

4. The UE of claim 3, wherein at least one of the media data or the DAM is configured such that the processor begins processing the DAM before the processor begins processing the media data.

5. A method, comprising:
 receiving, by a UE, display adaptation metadata (DAM), wherein the DAM is configured in an International Standards Organization (ISO) Base Media File Format (ISOBMFF) or an MPEG-2 Transport System (M2TS);
 determining, by the UE, a constant backlight voltage time interval value from the DAM;
 in response to determining that the number of constant-backlight-voltage-time-interval values is greater than 1, making the DAM available to a display with a lead time relative to a video composition time greater than or equal to a largest constant backlight voltage time interval value; and
 based on the DAM made available to the display with a lead time greater than or equal to the largest constant-backlight-voltage-time-interval value, adjusting by the display, its control settings with sufficient time in advance of displaying the associated media data.

6. The method of claim 5, wherein the DAM comprises at least one of receiver dependent metadata, contrast-enhancement metadata, or non-aggregated quality levels, and wherein the DAM is associated with a particular packet of media data.

7. The method of claim 5, further comprising receiving media data by the UE.

8. The method of claim 7, wherein receiving comprises the receiving media data concurrently with the DAM.

9. The method of claim 8, wherein at least one of the media data or the DAM is configured such that the UE begins processing the DAM before the UE begins processing the media data.

10. A non-transitory computer readable medium comprising a plurality of instructions that, when executed by a processor, are configured to cause the processor to:
 receive display adaptation metadata (DAM), wherein the DAM is configured in an International Standards Organization Base Media File Format (ISOMBFF) or in a Motion Pictures Expert Group 2 (MPEG-2) transport system (M2TS);
 determine a constant backlight voltage time interval value from the DAM;
 in response to determining that the number of constant-backlight-voltage-time-interval values is greater than 1, make the DAM available to a display with a lead time relative to a video composition time greater than or equal to a largest constant backlight voltage time interval value; and
 based on the DAM made available to the display with a lead time greater than or equal to the largest constant-backlight-voltage-time-interval value, adjust display control settings with sufficient time in advance of displaying the associated media data.

11. The non-transitory computer readable medium of claim 10, wherein the DAM comprises at least one of receiver dependent metadata, contrast-enhancement metadata, or non-aggregated quality levels, wherein the DAM is associated with a particular packet of media data.

12. The non-transitory computer readable medium of claim 10, wherein the plurality of instructions is configured to cause the processor to process the DAM before processing the media data.

13. The non-transitory computer readable medium of claim 12, wherein at least one of the media data or the DAM is configured so that the plurality of instructions cause the processor to begin processing the DAM before the processor begins processing the media data.

14. The non-transitory computer readable medium of claim 10, further comprising receiving media data.

15. The non-transitory computer readable medium of claim 14, wherein the media data is received concurrently with the DAM.

16. The non-transitory computer readable medium of claim 15, wherein at least one of the media data or the DAM is configured such that the processor begins processing the DAM before the UE begins processing the media data.

* * * * *